Figures 1, 2:
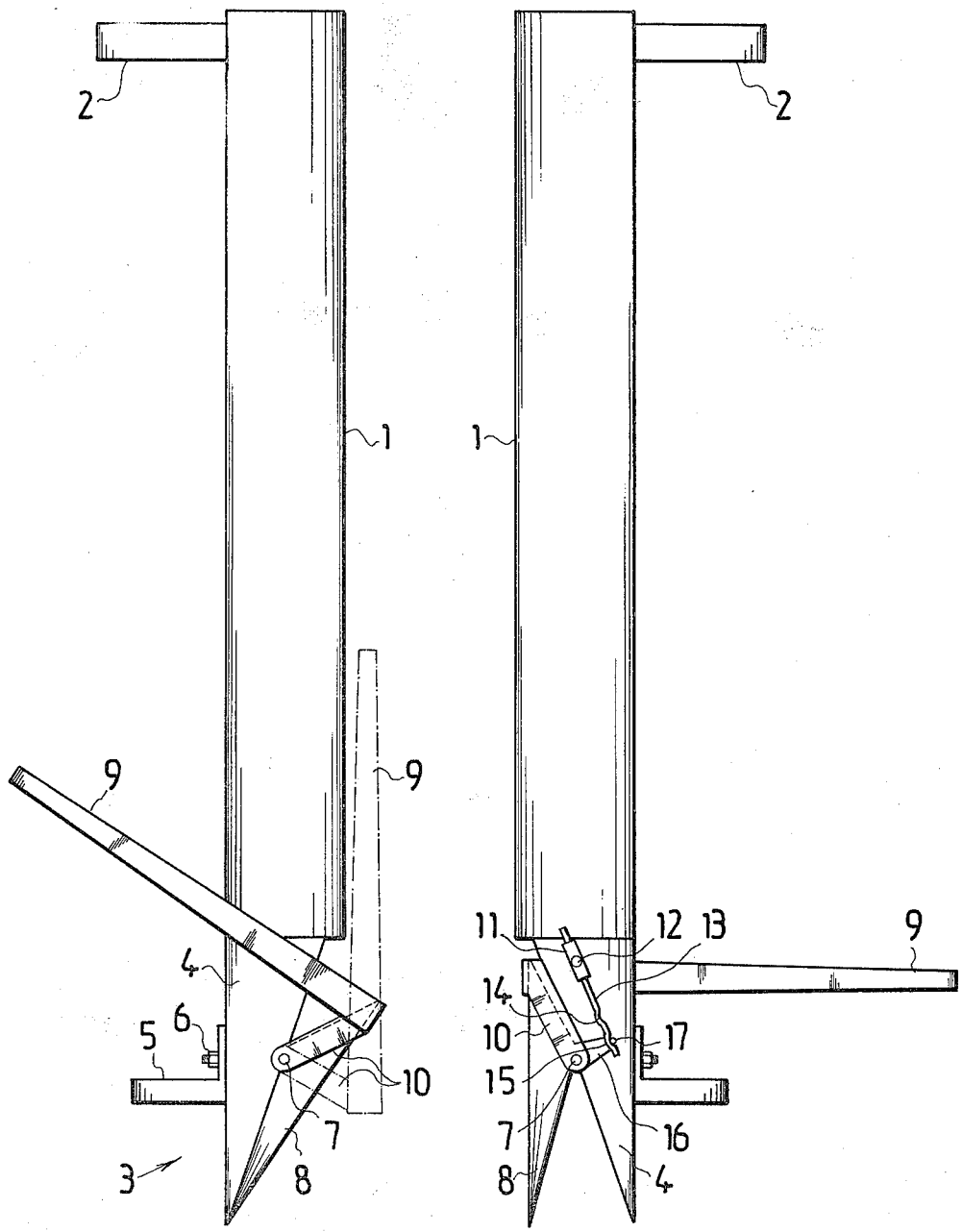

United States Patent [19]

Marttinen

[11] 4,444,131

[45] Apr. 24, 1984

[54] SEEDLING PLANTING MEANS

[75] Inventor: Toivo Marttinen, Puntala, Finland

[73] Assignee: T. Marttinen Ky, Puntala, Finland

[21] Appl. No.: 442,837

[22] Filed: Nov. 18, 1982

[30] Foreign Application Priority Data

Nov. 20, 1981 [FI] Finland ................................. 813685
Feb. 24, 1982 [FI] Finland ................................. 820609

[51] Int. Cl.³ ............................................. A01C 11/02
[52] U.S. Cl. ........................................ 111/4; 111/3; 294/50.9
[58] Field of Search ..................... 111/3, 4, 92, 97, 98; 294/50.8, 50.9, 104

[56] References Cited

U.S. PATENT DOCUMENTS

| 1,870,043 | 8/1932 | Erickson | 111/4 |
| 2,216,720 | 10/1940 | Cousins | 111/4 |
| 3,749,034 | 7/1973 | Bergius et al. | 111/4 |
| 3,765,347 | 10/1973 | Tormstrom | 111/4 |

Primary Examiner—Richard T. Stouffer
Assistant Examiner—Bradley M. Lewis

[57] ABSTRACT

A seedling planter comprising a planting tube provided with a handle and having on its lower end a crown which produces in the soil a planting hole, this crown comprising on the continuation of the planting tube a stationary jaw tapering in wedge fashion towards its tip and having a cross sectional shape conforming to that of the planting tube, and to the lateral margins of this jaw having been affixed pivot pins located in the vertical plane passing through the planting tube's centre-line, on these pivot pins being turnably carried a moving jaw, likewise tapering in wedge fashion in its tip portion, and a yoke lever with U-shaped legs, to the bow part of which has been affixed a pedal lever located on one side of the planting tube, by depressing which the jaw can be made to assume its opened, planting position, in which it is securable with a locking device comprising, affixed to the stationary jaw on the side opposite to the pedal lever, a substantially vertical elastic metal wire provided with two bends spaced from each other vertically and serving an upper and lower dead-point, and this locking device furthermore comprising, belonging as an integral part to the movable jaw, a lug rotatably carried on the pivot pin on the side of the wire and carrying at its tip a pin departing to some distance in lateral direction.

2 Claims, 3 Drawing Figures

SEEDLING PLANTING MEANS

The present invention concerns a seedling planting means comprising a planting tube provided with a handle and having on its lower end a crown which produces in the soil a planting hole, this crown comprising on the continuation of the planting tube a stationary jaw tapering in wedge fashion towards its tip and having a cross sectional shape conforming to that of the planting tube, and to the lateral margins of this jaw having been affixed pivot pins located in the vertical plane passing through the planting tube's centre-line, on these pivot pins being turnably carried a moving jaw, likewise tapering in wedge manner in its tip portion, and a yoke lever with U-shaped legs, to the bow part of which has been affixed a pedal lever located on one side of the planting tube and by depressing which the jaw can be made to assume its opened, planting position, in which it is securable with a locking means comprising, affixed to the stationary jaw on the side opposite to the pedal, a substantially vertical elastic metal wire provided with two bends spaced from each other vertically and serving as upper and lower dead-point, and this locking means furthermore comprising, belonging as an integral part to the movable jaw, a lug rotatably carried on the pivot pin on the side of the wire and carrying at its tip a pin departing to some distance in lateral direction.

The seedling planting means is principally intended for lump seedlings used in forest planting, but which is also appropriate e.g. in the planting of garden plants. The planting means comprises a planting tube about 1 m in length and provided with a handle, having on its lower end a crown, which as the planting tube is urged into the soil forms a hole for the seedling that is being planted. The crown comprises a stationary jaw on the continuation of the planting tube and to which has been pivotally attached a movable jaw, which as the planting tube is being driven into the soil rests tightly against the stationary jaw so that the lower end of the planting tube is closed. Both jaws have been tapered in wedge fashion in their tip portion in order to facilitate the penetration into the ground, whereby in the soil is produced a hole, or pit, most nearly resembling a cone standing on its apex, into which the plant or seedling that one desires to plant can be dropped from the top end of the planting tube, after the movable jaw has been opened.

Opening the crown of the planting tube is effected by depressing the pedal, whereby the movable jaw will turn away from the stationary jaw, pushing to one side the soil in front of it and thereby widening the planting hole, In its planting position, that is with the crown fully opened, the movable jaw is locked with a latch mechanism to be immovable, in order that the seedling might be allowed without obstruction to fall into the hole made in the ground by the crown.

Planting means operating in the manner just described are known in the art, and they comprise a movable jaw pivotally attached to the stationary jaw of the crown, which has by its top part been integrally connected with one end of the pedal lever. One such seedling planting means has been disclosed in the Finnish Pat. No. 50 033, which has been provided with a triggerable latch means.

The object of the present invention is to provide a seedling planting means which is simpler than the seedling planting means disclosed in the patent cited above, and which in addition is better in its efficiency of operation owing to the circumstance that it has been possible to increase the length of the pedal lever opening the movable jaw into planting position, whereby less force than before is required to open the jaw, even in hard soil. Moreover, the locking of the movable jaw in its planting position and its releasing therefrom is accomplished simply in the planting means of the invention, without the latch and triggering mechanisms of the above-mentioned Finnish Pat. No. 50 033.

The seedling planting means of the invention is furthermore easier to transport because the pedal lever thereon provided may in the transporting position be turned to parallel the planting tube. The seedling planting means of the invention is characterized in that the yoke lever has been attached to one end of the pedal lever at an acute angle pointing downward therefrom, and that the length of the yoke lever's legs is equivalent to the distance of the movable jaw's upper end from the pivot pins, so that as the pedal lever is being pressed down the bow part of the yoke lever comes into contact with the upper end of the jaw, compelling the jaw to turn about the pivot pins, whereby when the lug is set into rotary motion the pin becomes detached from the bend constituting the upper dead point and slides along the surface of the wire to the bend serving as lower dead point and becoming locked there by effect of the wire's elasticity.

In particular when reforesting after felling operations, one has now and then to plant seedlings even in hard soil, which offers the crown of the planting tube a great resistance, with the consequence that great force must be exercised when driving the planting tube into the soil. It would be desirable in such instances that the movable jaw, which in the crown-inserting position has to lie tightly against the stationary jaw, would have a shape serving to minimize the penetration resistance of the crown.

The objective mentioned above has largely been attained with the seedling planting means of the invention, of which the movable jaw has been provided with a ridge having a cross section shaped like a right-angled triangle and which according to one embodiment of the invention is characterized in that with a view to facilitating the penetration of the crown into the ground the ridge has been flattened on both lateral margins to form planes extending from under the bushings up to the tip of the jaw.

Figure 3:
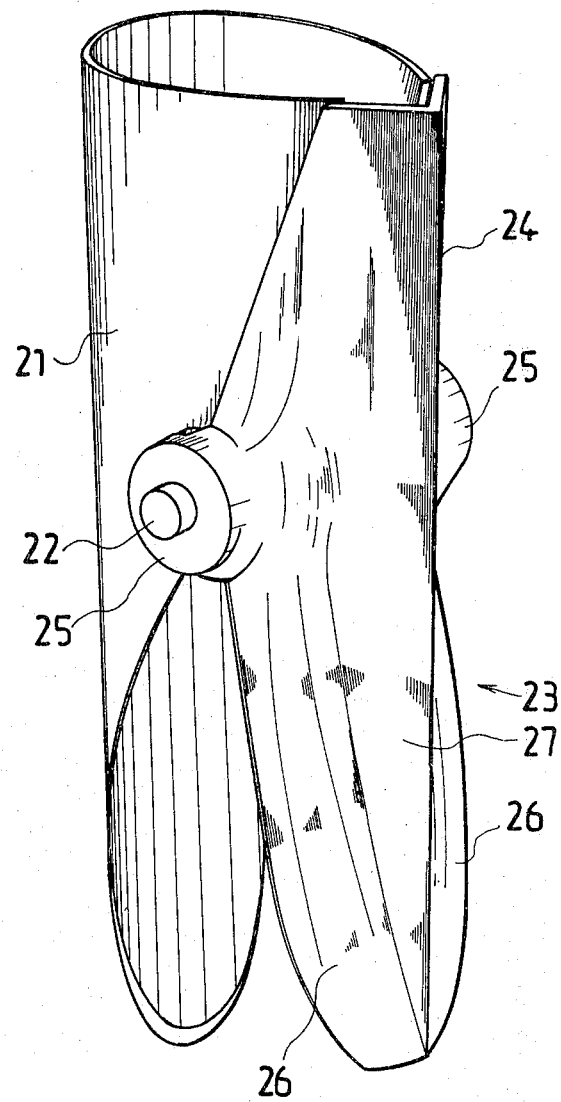

The invention is illustrated in the following by means of drawings, wherein:

FIG. 1 presents the seedling planting means of the invention in elevational view, FIG. 2 presents it in elevational view, viewed from the opposite side, and FIG. 3 presents the seedling planting means according to another embodiment of the invention, in perspective, in the opened, or planting, position, some components having been omitted for the sake of perspicuity.

As shown in FIG. 1, the seedling planting means comprises a vertical planting tube 1, which may have a circular, quadrangular, or for that matter, water drop-shaped cross section, depending in each particular case on the shape of the lump seedling to be planted. The planting tube has on its top part a horizontal handle 2. On the lower part of the planting tube 1 is provided a crown 3, shown in FIG. 1 in its closed position, that is, at such time when the planting tube is being pushed into the ground. The crown 3 comprises, affixed on the continuation of the planting tube, a jaw 4 made to taper in wedge fashion in its tip part and conforming as to its cross section with the cross-sectional configuration of the planting tube. On the stationary jaw 4 has been mounted a yoke-like projection 5, by means of which the entering of the crown 3 into the ground is confined, this being done by adjusting its distance from the point of the crown 3 by the aid of a nut attachment 6.

The other half of the crown 3 consists of a movable jaw 8 carried turnably on pivot pins 7 provided on both lateral margins of the stationary jaw 4 and which is similarly tapered in wedge fashion in its tip portion, like the jaw 4. In order that the movable jaw 8 might be able to turn without hindrance about the pivot pins 7 into its opened position (FIG. 2), it has been made wedge-shaped in its upper part as well, i.e., the movable jaw 8 is triangular. The pivot pins 7 have been disposed to be located in the vertical plane passing through the longitudinal centre-line of the planting tube 1, whereby when the jaw 8 swivels into its fully opened extreme position a planting hole of uniform depth is produced. The location of the pivot pins 7 in the height direction of the crown 3 is slightly above the maximum planting depth determined by the foot depressor 5.

For opening the movable jaw 8 into its opened position, the pedal lever 9 is used which has been disposed on one side of the planting tube 1 and to one end of which a U-shaped yoke lever 10 has been attached by its bow part. The legs of the yoke lever 10 are rotatably carried on the pivot pins 7, and their length is such that it is equivalent to the distance to the upper end of the jaw 8 from the pivot pins 7, whereby the bow part of the yoke lever 10 comes into contact with the upper part of the jaw 8 when the pedal lever 9 is turned from its transport position (indicated with dotted lines in FIG. 1) into the initial position for opening the crown. The yoke lever 10 has been attached to the end of the pedal lever 9 at an acute angle departing downwardly therefrom, so that when the pedal lever is pressed downward into horizontal position (FIG. 2) the crown will have opened fully, that is, the movable jaw 8 will have turned about the pivot pins 7 into its extreme position.

In FIG. 2 is also shown the locking means for the jaw 8, the holder of which is a sleeve 11 mounted on the upper part of the side of the stationary jaw 4 opposite to the pedal lever 9, provided with a tightening bolt 12. The locking means proper consists of an elastic metal wire 13 passing through the sleeve 11 and disposed to be substantially vertical, and in which have been provided bends 14,15 serving as upper and lower dead-points, and of a lug 16 provided as an integral part of the movable jaw 8 and turnably carried on the pivot pin 7 on the same side where the wire 13 is found and carrying at its tip a pin 17 departing somewhat in the lateral direction of the lug.

On opening the crown 3, the movable jaw 8 swivels about the pivot pins 7 and the lug 16 describes a circle, whereby the pin 17 rises out from the bend 14 serving as upper dead point and slides along the wire 13 to the bend 15 serving as lower dead point and becoming locked therein by effect of the elasticity of the wire 13, preventing the jaw 8 from moving. When it is desired to return the crown to the closed position of FIG. 1, and to lock it in this position, all that is needed is to tap the tip of the jaw 8, in oblique position, against the ground, whereby the jaw 8 turns inward and whereby the lug 16 swings upward and the pin 17 thereon slides along the surface of the elastic wire 13 and becomes locked in the bend 14 serving as upper dead point.

As shown in FIG. 3, the crown of the planting tube comprises a stationary jaw 21, which is a piece of tubing substantially conforming to the cross section of the planting tube, made by means of an oblique cut to be tapering in wedge fashion towards its tip portion, whereby is promoted the penetration of the planting tube into the soil. The stationary jaw 21 carries on both its sides a pivot pin 22, the movable jaw 23 being rotatably carried on these pins. The pivot pins have been disposed to be located in the vertical plane passing through the longitudinal centre-line of the stationary jaw 21. The movable jaw 23 has been made preferably of wear-resistant sheet steel, with a shape and size consistent with the oblique cut made on the stationary jaw 21, implying that the steel piece becomes narrower from its widest central part at the pivot pins 22 towards its tip as well as its other end. With a view to forming the movable jaw 23, the steel sheet has been angulated at its longitudinal centre-line 24 to constitute a ridge so that the parts on either side of the plate's longitudinal centre-line form an angle of 90°. In this manner on the plate has been produced a ridge extending from one end to the other thereof. Thereafter, in the central part of the movable jaw 23, on both margins thereof, have been affixed bushings 25 for attaching the jaw 23 to the pivot pins 22 of the stationary jaw 21.

With a view to reducing the resistance to the movable jaw's 23 penetration into the soil, the part of the jaw 23 entering the soil (the part below the pivot bushings) has been flattened on both marginal edges to have the shape of planes 26, between which remains a pyramid-shaped ridge 27 narrowing in the direction downward from the pivot bushings 25 and one edge-line of which is the longitudinal centre-line 24 of the plate constituting the jaw. This ridge 27 with the shape of a right-angled triangle facilitates the penetration of the crown into the ground, in that it cuts open the soil before itself, whereafter when the movable jaw turns to be open the planar parts 26 of the jaw move the soil to one side on both sides of the cut, with ease. Consequently, the establishing of a planting hole, even in hard soil, requires less force at the jaw opening than heretofore.

The invention is not confined to the description given above: it may be modified within the scope of the claims following below.

I claim:

1. Improvement in a seedling planting means comprising a planting tube provided with a handle and having on its lower end a crown which produces in the soil a planting hole, this crown comprising on the continuation of the planting tube a stationary jaw tapering in wedge fashion towards its tip and having a cross sectional shape conforming to that of the planting tube, and to the lateral margins of this jaw having been affixed pivot pins located in the vertical plane passing through the planting tube's centre-line, on these pivot pins being turnably carried a moving jaw, likewise tapering in wedge fashion in its tip portion, and a yoke lever with U-shaped legs, to the bow part of which has been affixed a pedal lever located on one side of the planting tube, by depressing which the jaw can be made to assume its opened, planting position, in which it is securable with a locking means comprising, affixed to the stationary jaw on the side opposite to the pedal lever, a substantially vertical elastic metal wire provided with two bends spaced from each other vertically and serving as upper and lower dead-point, and this locking means furthermore comprising, belonging as an integral part to the movable jaw, a lug rotatably carried on the pivot pin on the side of the wire and carrying at its tip a pin departing to some distance in lateral direction, wherein the improvement comprises that the yoke lever has been attached to one end of the pedal lever at an acute angle pointing downward therefrom, and that the length of the legs of the yoke lever is equivalent to the distance of the upper end of the movable jaw from the pivot pins so that on pressing down on the pedal lever the bow part of the yoke lever comes into contact with the upper end of the jaw, compelling the jaw to turn about the pivot pins, whereat as the lug is set into a circular motion the pin becomes detached from the bend constituting the upper dead point and slides on the surface of the wire to the bend constituting the lower dead point, becoming locked there by effect of the elasticity of the wire.

2. Seedling planting means according to claim 1, where the movable jaw has been provided with a ridge having a cross section shaped like a right-angled triangle, characterized in that with a view to facilitating the penetration of the crown into the soil, the ridge has been flattened on both lateral margins to form a plane extending from below the bushings to the tip of the jaw.

* * * * *